(12) United States Patent
Kim (10) Patent No.: US 10,865,563 B2
(45) Date of Patent: Dec. 15, 2020

(54) SELF-ASSEMBLY HOT WATER MAT

(71) Applicant: J&C Trading Co., LTD., Chungcheongbuk-do (KR)

(72) Inventor: Jung Nam Kim, Seoul (KR)

(73) Assignee: J&C Trading Co., LTD.

( * ) Notice: Subject to any disclaimer, the term of this patent is extended or adjusted under 35 U.S.C. 154(b) by 253 days.

(21) Appl. No.: 16/038,627

(22) Filed: Jul. 18, 2018

(65) Prior Publication Data

US 2019/0249432 A1  Aug. 15, 2019

(30) Foreign Application Priority Data

Feb. 13, 2018  (KR) .......................... 10-2018-0017977

(51) Int. Cl.
*F24D 3/16* (2006.01)
*E04C 2/52* (2006.01)
(Continued)

(52) U.S. Cl.
CPC .............. *E04C 2/525* (2013.01); *F24D 3/125* (2013.01); *F24D 3/127* (2013.01); *F24D 3/142* (2013.01); *F24D 3/146* (2013.01); *F24D 13/04* (2013.01); *A47C 21/048* (2013.01); *E04F 2290/023* (2013.01); *F24D 3/1058* (2013.01); *F24D 3/16* (2013.01); *F24D 2220/2081* (2013.01)

(58) Field of Classification Search
CPC .......... F24D 3/125; F24D 3/142; F24D 3/146; F24D 3/1058; F24D 3/127; F24D 3/16; F24D 13/04; F24D 19/0024; F24D 19/1015; A47C 21/048; E04F 2290/023; E04F 13/074

USPC ..................................................... 237/69, 19
See application file for complete search history.

(56) References Cited

U.S. PATENT DOCUMENTS 4,619,801 A * 10/1986 Engel ...................... F24D 3/142
264/146
4,723,598 A * 2/1988 Yoshio .................... F24D 3/125
165/136

(Continued)

FOREIGN PATENT DOCUMENTS

CH            709732         12/2015
DE          3411339 A1 *     10/1985  ............. F24D 3/142

(Continued)

OTHER PUBLICATIONS

"KR10-2018-0017977—KIPO Written_Opinion_(Translated).pdf", International office written opinion, KIPO, dated Oct. 4, 2019. (Year: 2019).*

(Continued)

*Primary Examiner* — Steven B McAllister
*Assistant Examiner* — Daniel E. Namay
(74) *Attorney, Agent, or Firm* — Perman & Green, LLP (57) ABSTRACT

A self-assembly hot water mat capable of extending through an assembly, the self-assembly hot water mat capable of being assembled with other self-assembly hot water mats, having four sides, and including a path for circulating hot water includes a plurality of hot water passages formed in the self-assembly hot water mat to provide a plurality of hot water flow paths, an inlet formed at each of the four sides, through which hot water flows in, and an outlet formed at each of the four sides and paired with the inlet, through which hot water flows out.

8 Claims, 6 Drawing Sheets

(51) Int. Cl.
*F24D 3/14* (2006.01)
*F24D 3/12* (2006.01)
*F24D 13/04* (2006.01)
F24D 3/10 (2006.01)
A47C 21/04 (2006.01)

(56) References Cited

U.S. PATENT DOCUMENTS

| | | | | |
|---|---|---|---|---|
| 5,497,826 A | * | 3/1996 | Ingram | F24D 13/022 165/56 |
| 6,270,016 B1 | * | 8/2001 | Fiedrich | F24D 3/16 237/69 |
| 6,311,764 B1 | * | 11/2001 | Schulz | E02F 3/3677 165/56 |
| 6,330,980 B1 | * | 12/2001 | Fiedrich | F24D 3/14 237/69 |
| 7,027,725 B2 | | 4/2006 | Kim et al. | |
| 7,658,005 B2 | * | 2/2010 | Sulzer | E04C 2/525 29/890.03 |
| 8,028,742 B2 | * | 10/2011 | Fiedrich | F24D 3/142 165/56 |
| 8,230,911 B2 | * | 7/2012 | Seerup | F24D 3/12 165/296 |
| 8,752,346 B1 | * | 6/2014 | Shaw | F24D 3/127 52/220.2 |
| 2004/0026525 A1 | * | 2/2004 | Fiedrich | F24D 3/142 237/69 |
| 2006/0027356 A1 | * | 2/2006 | Sulzer | F24D 3/125 165/53 |
| 2007/0017656 A1 | * | 1/2007 | Da Rold | F24D 3/14 165/48.1 |
| 2009/0178717 A1 | * | 7/2009 | Mirchildon | F24D 3/1066 137/80 |
| 2010/0126707 A1 | * | 5/2010 | Miyamura | F24F 5/0089 165/168 |
| 2011/0073274 A1 | | 3/2011 | Brummitt et al. | |
| 2011/0168794 A1 | * | 7/2011 | Lee | F24D 3/142 237/59 |
| 2011/0172830 A1 | * | 7/2011 | Milder | F24D 19/1009 700/277 |
| 2012/0103580 A1 | * | 5/2012 | Buttignol | F24D 3/142 165/169 |
| 2014/0096763 A1 | * | 4/2014 | Barmore | E04C 2/525 126/714 |
| 2014/0096931 A1 | * | 4/2014 | Keiichiro | F24D 3/142 165/49 |
| 2014/0116644 A1 | * | 5/2014 | Kaneko | F24D 3/142 165/56 |
| 2014/0323799 A1 | * | 10/2014 | Van Driel | A61B 5/6892 600/28 |
| 2015/0159884 A1 | * | 6/2015 | Whang | F24D 3/142 237/69 |
| 2018/0202669 A1 | * | 7/2018 | Baratti | F24D 3/165 |

FOREIGN PATENT DOCUMENTS

| | | | | |
|---|---|---|---|---|
| EP | 1835234 A2 | * | 9/2007 | F24D 3/142 |
| JP | 61228230 A | * | 10/1986 | F24D 3/125 |
| JP | 61256121 A | * | 11/1986 | F24D 3/125 |
| JP | 01155127 A | * | 6/1989 | |
| JP | 02298730 A | * | 12/1990 | |
| JP | 04356625 A | * | 12/1992 | |
| JP | 05126346 A | * | 5/1993 | |
| JP | 0741318 | | 7/1995 | |
| JP | 2000080755 A | * | 3/2000 | F24D 3/142 |
| JP | 2001330260 | | 11/2001 | |
| JP | 2002228170 | | 8/2002 | |
| JP | 2002243176 | | 8/2002 | |
| JP | 20065404929 | | 2/2006 | |
| KR | 20140049395 | | 4/2014 | |

OTHER PUBLICATIONS

Extended European Search Report dated Jan. 31, 2019 for European Patent Application No. 18184636.1.

* cited by examiner

SELF-ASSEMBLY HOT WATER MAT

CROSS-REFERENCE TO RELATED APPLICATION

This application claims the benefit of Korean Patent Application No. 10-2018-0017977, filed on Feb. 13, 2018, in the Korean Intellectual Property Office, the disclosure of which is incorporated herein in its entirety by reference.

BACKGROUND

1. Field

One or more aspects of the present disclosure relate to hot water mats capable of heating, and more particularly, to self-assembly hot water mats capable of being extended through assembly.

2. Description of the Related Art

Ondol is the Korean traditional floor heating system in which a pipe is installed inside a floor and hot water is circulated through the pipe to heat the floor.

In addition to much initial construction cost, Ondol may require more cost than the initial cost particularly when the Ondol is installed where floor construction is completed. Accordingly, in order to use Ondol at low cost, hot water mats are produced and circulated on the market. The following patent document discloses hot water mats.

However, the related-art hot water mats are released in the form of a bed mattress or a blanket and thus have a spatial limitation in that they may be used only in a narrow space. Also, the related-art hot water mats operate independently of each other and thus have a limitation in that the space extension (i.e., Ondol area extension) thereof is not easy.

SUMMARY

One or more aspects of the present disclosure include self-assembly hot water mats capable of assembling hot water mats together and maximizing convenience in assembly.

Other objects and advantages of the present disclosure may be understood by the following description and will be more clearly understood by aspects of the present disclosure of the present disclosure. Also, it will be easily understood that the objects and advantages of the present disclosure may be implemented by components and combinations thereof stated in the appended claims.

Additional aspects will be set forth in part in the description which follows and, in part, will be apparent from the description, or may be learned by practice of the presented aspects of the present disclosure.

According to one or more aspects of the present disclosure, a self-assembly hot water mat capable of being assembled with other self-assembly hot water mats, having four sides, and including a path for circulating hot water includes: a plurality of hot water passages formed in the self-assembly hot water mat to provide a plurality of hot water flow paths; an inlet formed at each of the four sides, through which hot water flows in; and an outlet formed at each of the four sides and paired with the inlet, through which hot water flows out.

A plurality of inlets and a plurality of outlets may be connected to the plurality of hot water passages, and the hot water flowing in through the inlet at any one of the four sides may flow out through the outlet at any one place selected among the four sides via the hot water passage.

A check valve for opening/closing a flow path may be installed at the inlet and the outlet.

By the check valve, the flow path may be opened when an extension connector is coupled and the flow path may be closed when the extension connector is separated.

One or more of check values of inlets of the self-assembly hot water mat may be coupled through the extension connector to one or more of check valves of outlets of other self-assembly hot water mats to connect a hot water flow path between hot water passages of the self-assembly hot water mats and hot water passages of other self-assembly hot water mats.

One or more bypass valves may be installed at the plurality of hot water passages and may be opened/closed to form one or more different hot water flow paths.

The one or more bypass valves may include a ball valve, and an operation handle or button may be exposed at a top portion of the self-assembly hot water mat.

The plurality of hot water passages may be hot water flow paths formed in the self-assembly hot water mat.

The plurality of hot water passages may be pipes having a hot water flow path formed therein, and the pipes may be buried in the self-assembly hot water mat.

The pipes may include: a main pipe extending from the inlet of the first side to the outlet of the second side and forming a largest length among the pipes; a first bypass pipe formed to extend from the inlet of the second side to the outlet of the fourth side; a second bypass pipe formed to extend from the inlet of the third side to the outlet of the first side; a third bypass pipe coupled to the main pipe at a point separated from the inlet of the first side at a certain distance and formed to extend from the coupling point to the inlet of the third side; a branch pipe branched from the first bypass pipe and formed to extend to the outlet of the third side; and a plurality of connection pipes connecting the pipes.

The plurality of connection pipes may include: a first connection pipe connecting the main pipe to the second bypass pipe; a second connection pipe connecting the main pipe to the first bypass pipe; a third connection pipe connecting the first bypass pipe to the second bypass pipe; and a fourth connection pipe connecting the branch pipe to the second bypass pipe.

The plurality of bypass valves may include: a first bypass valve installed to control a hot water flow between the main pipe and the second bypass pipe; a second bypass valve installed to control a hot water flow between the main pipe and the first bypass pipe; a third bypass valve installed to control a hot water flow between the first bypass pipe and the second bypass pipe; a fourth bypass valve installed to control a hot water flow between the branch pipe and the second bypass pipe; a fifth bypass valve installed to control a hot water flow between the main pipe and the third bypass pipe; and a sixth bypass valve installed to control a hot water flow between the branch pipe and the first bypass pipe.

BRIEF DESCRIPTION OF THE DRAWINGS

These and/or other aspects will become apparent and more readily appreciated from the following description of the aspects of the present disclosure, taken in conjunction with the accompanying drawings in which.

DETAILED DESCRIPTION

Reference will now be made in detail to aspects of the present disclosure, examples of which are illustrated in the accompanying drawings, wherein like reference numerals refer to like elements throughout. In this regard, the aspects of the present disclosure may have different forms and should not be construed as being limited to the descriptions set forth herein. Accordingly, the aspects of the present disclosure are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The above and other objects, features, and advantages of the present disclosure will become more apparent from the following detailed description of the present disclosure when taken in conjunction with the accompanying drawings, and thus those of ordinary skill in the art may easily implement the technical concept of the present disclosure. Also, in the following description, detailed descriptions of well-known functions or configurations will be omitted since they would unnecessarily obscure the subject matters of the present disclosure. Hereinafter, example aspects of the present disclosure will be described in detail with reference to the accompanying drawings.

Figure 1:
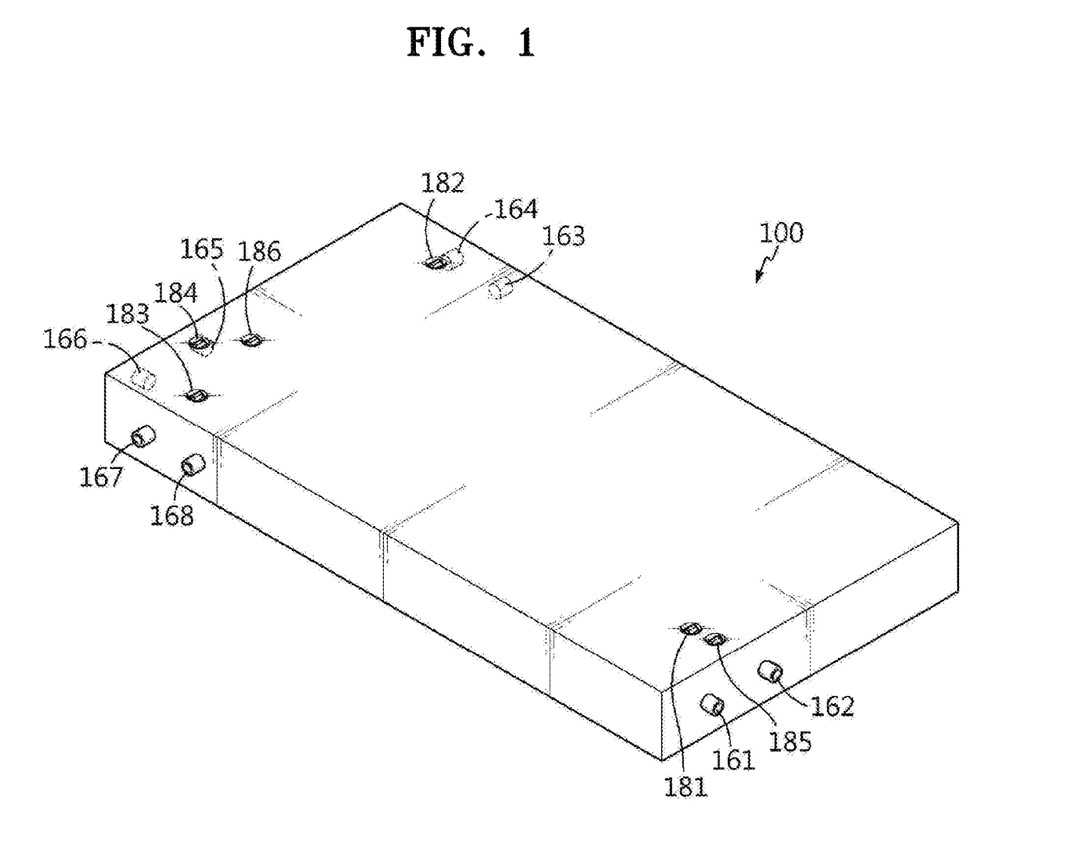
FIG. 1 is a perspective view of a self-assembly hot water mat according to an aspect of the present disclosure.
Figure 2:
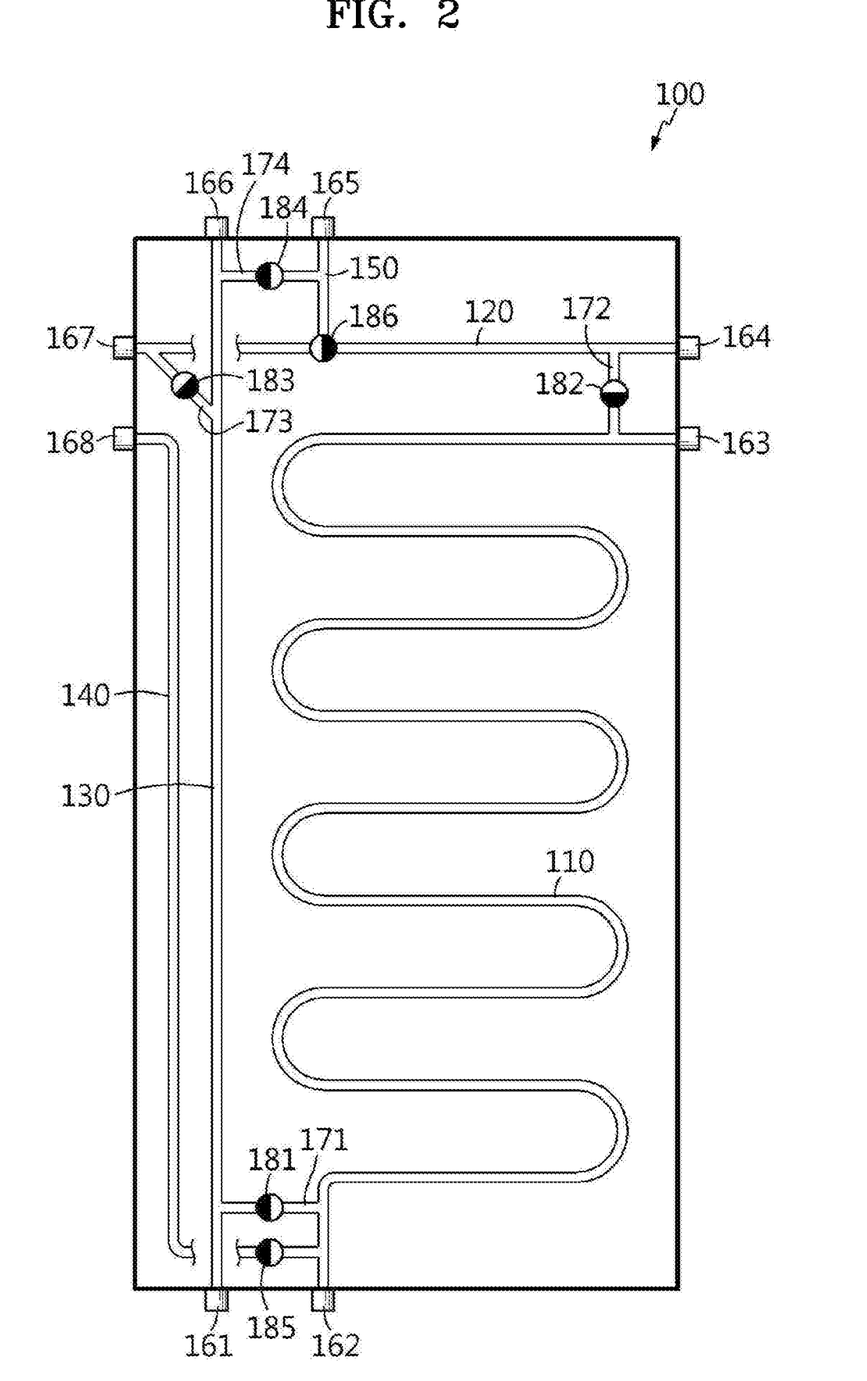
FIG. 2 is an internal plan view of a self-assembly hot water mat according to an aspect of the present disclosure.

FIG. 1 is a perspective view of a self-assembly hot water mat according to an aspect of the present disclosure. FIG. 2 is an internal plan view of a self-assembly hot water mat according to an aspect of the present disclosure.

Referring to FIGS. 1 and 2, a self-assembly hot water mat 100 according to an aspect of the present disclosure may have a rectangular shape and may include a plurality of check valves, for example, first to eighth check valves 161 to 168, formed in pairs at respective sides thereof, a main pipe 110 for passing hot water to heat a top side thereof, a plurality of bypass pipes, for example, first, second, and third bypass pipes 120, 130, and 140, for providing a passage for bypassing hot water, a branch pipe 150 extending to an upper side thereof from a particular point of the first bypass pipe 120, a plurality of connection pipes, for example, first to fourth connection pipes 171 to 174, forming a connection passage between pipes, and a plurality of bypass valves 181 to 186.

The self-assembly hot water mat 100 may include a top plate and a bottom plate for receiving the pipes or may further include a sheet coupled to the top plate to provide comfort.

The main pipe 110 may be formed inside the self-assembly hot water mat 100 in a U-shaped alternating pattern, as a pipe forming the largest heating area among the pipes. One end of the main pipe 110 may be located at the lower side (i.e., the first side), and the other end of the main pipe 110 may be formed at the right side (i.e., the second side). The second and third check valves 162 and 163 may be coupled to both ends of the main pipe 110.

The first bypass pipe 120 may be formed in the self-assembly hot water mat 100 at a certain distance from the main pipe 110. The first bypass pipe 120 may be a pipe used as a passage for bypassing hot water, wherein one end of the first bypass pipe 120 may be arranged at the right side (i.e., the second side), and the other end thereof may be arranged at the left side (i.e., the third side). Also, the first bypass pipe 120 may be arranged in the self-assembly hot water mat 100 in parallel to the horizontal axis. Also, the fourth and seventh check valves 164 and 167 may be coupled to both ends of the first bypass pipe 120.

Also, the second bypass pipe 130 traversing in the vertical direction of the self-assembly hot water mat 100 may be formed in the self-assembly hot water mat 100. The second bypass pipe 130 may be a pipe used as a passage to bypass hot water, wherein one end of the second bypass pipe 130 may be arranged at the lower side (i.e., the first side), and the other end thereof may be arranged at the upper side (i.e., the third side). Also, the second bypass pipe 130 may be arranged in the self-assembly hot water mat 100 in parallel to the vertical axis. The first and sixth check valves 161 and 166 may be coupled to both ends of the second bypass pipe 130.

The third bypass pipe 140 connected to the main pipe 110 and extending to the left side (i.e., the fourth side) may be formed in the self-assembly hot water mat 100. The third bypass pipe 140 may be connected to the main pipe 110 near a portion where the second check valve 162 is coupled, may extend from the connection point as a start point, and may be coupled to the eighth check valve 168 near a portion of the fourth side where the seventh check valve 167 of the first bypass pipe 120 is arranged, to terminate the extension. Unlike the other pipes, only one end of the third bypass pipe 140 may be coupled to the eighth check valve 168 and the other end thereof may be connected to the main pipe 110.

The second bypass pipe 130 and the third bypass pipe 140 may also be used to circulate the hot water and may be used to change the circulation path of the hot water.

Meanwhile, the branch pipe 150 extending from a particular point of the first bypass pipe 120 to the upper side (i.e., the third side) may be formed in the self-assembly hot water mat 100. The branch pipe 150 may be used to convert the hot water flow of the first bypass pipe 120 into another direction. The fifth check valve 165 may be coupled to an end of the branch pipe 150.

The first to fourth connection pipes 171 to 174 may be coupled between the pipes other than the third bypass pipe 140. That is, the main pipe 110 and the second bypass pipe 130 may be connected to each other through the first connection pipe 171. Also, the main pipe 110 and the first bypass pipe 120 may be connected to each other through the second connection pipe 172, and the first bypass pipe 120 and the second bypass pipe 130 may be connected to each other through the third connection pipe 173. Also, the branch pipe 150 and the second bypass pipe 130 may be connected to each other through the fourth connection pipe 174.

As illustrated in FIG. 2, pairs of the first to the eighth check valves 161 to 168 may be formed at the respective sides of the self-assembly hot water mat 100. That is, the first check valve 161 and the second check valve 162 may be formed at the first side, the third check valve 163 and the fourth check valve 164 may be formed at the second side, the fifth check valve 165 and the sixth check valve 166 may be formed at the third side, and the seventh check valve 167 and the eighth check valve 168 may be formed at the fourth side. The intervals between the check valves formed on the respective sides may be equal to each other.

When the first to eight check valves 161 to 168 are coupled to extension connectors (see 31a and 31b in FIG. 3), the internal passage thereof may be opened, and when the check valves 161 to 168 are opened, the hot water may flow inside or outside. The extension connectors, for example, first and second extension connectors 31a and 31b, may be a tool for extending the length of pipes and may have a space formed therein to move the hot water. When the check valves 161 to 168 are separated from the first and second extension connectors 31a and 31b, the check valves 161 to 168 may close the internal passages of the pipes to block the flow of the hot water.

The pairs of the first to the eighth check valves 161 to 168 may be divided into hot water inflow check valves 162, 164, 166, and 168 and hot water outflow check valves 161, 163, 165, and 167. The intervals between the hot water inflow check valves 162, 164, 166, and 168 and the hot water outflow check valves 161, 163, 165, and 167 formed at the same sides may be equal to each other. As the extension connector is connected to the hot water inflow check valves 162, 164, 166, and 168 and open the pipe, hot water may flow into the pipe from another self-assembly hot water mat or a hot water boiler, and as the extension connector is connected to the hot water outflow check valves 161, 163, 165, and 167 and open the pipe, hot water may flow out from the self-assembly hot water mat 100 to the other self-assembly hot water mat or the hot water boiler. Quick-coupling type valves may be used as the check valves 161 to 168. In this case, female couplers may be used as the check valves 161 to 168, and male couplers may be used as the extension connectors (see 31a and 31b in FIG. 3) coupled to the check valves 161 to 168.

Meanwhile, although the check valves 161 to 168 are illustrated as protruding from the sides of the self-assembly hot water mat 100, the check valves 161 to 168 may also be implemented in a hidden form in which the ends of the check valves 161 to 168 do not protrude outside the self-assembly hot water mat 100.

The first to fourth bypass valves 181 to 184 may be installed at the first to fourth connection pipes 171 to 174, respectively. Also, the sixth bypass valve 186 may be installed at a coupling point where the first bypass pipe 120 and the branch pipe 150 are coupled. The sixth bypass valve 186 may include a valve such as a three-way valve. The fifth bypass valve 185 may be installed at a point where the main pipe 110 and the third bypass pipe 140 are coupled.

The first to sixth bypass valves 181 to 186 may include ball valves as valves for controlling the hot water flow. Depending on whether the bypass valves 181 to 186 are opened or closed, it may be determined which pipe the hot water is to circulate through. Instead of the ball valves, various types of valves for controlling the hot water flow, blocking the hot water flow in a certain direction, and allowing the hot water flow in another direction may be used as the bypass valves 181 to 186.

As illustrated in FIG. 1, the end of each of the check valves 161 to 168 may be exposed at the side of the self-assembly hot water mat 100, and an operation handle (or button) of each of the bypass valves 181 to 186 may be exposed at the top plate of the self-assembly hot water mat 100. The top plate of the self-assembly hot water mat 100 may be provided with a concaved receiving space for receiving the operation handle (or button) of each of the bypass valves 181 to 186, and when the operation handles (or buttons) of the bypass valves 181 to 186 are arranged in this way, the user may comfortably sit or lie on the self-assembly hot water mat 100 without feeling a foreign body.

A protection cover for protecting the operation handles (or buttons) of the bypass valves 181 to 186 may be further provided at the top plate of the self-assembly hot water mat 100, corresponding to the number of bypass valves 181 to 186. The protection cover may prevent the open/close state of the bypass valve from being changed by the action of the user.

Meanwhile, each pipe may be arranged in the self-assembly hot water mat 100 through a hose arrangement. Also, a pattern of each pipe may be formed at the top plate and/or the bottom plate of the hot water mat to integrate the pipe and the top plate and/or the bottom plate. In this case, a piping pattern having a pipe connection structure such as the main pipe 110, the bypass pipes 120, 130, and 140, the connection pipes 171 to 174, and the branch pipe 150 may be pre-formed at the top plate and/or the bottom plate. In this case, the piping pattern may be formed in the self-assembly hot water mat 100 through the coupling of the top plate and the bottom plate without performing a separate piping operation.

As described above, the self-assembly hot water mat 100 according to an aspect of the present disclosure may be used in singularity or in plurality (by extension-coupling) according to the open/close states of the bypass valves 181 to 186, the internal pipe structure, and the check valves 161 to 168 formed at the respective sides.

The valve state and the hot water flow in the case where a single self-assembly hot water mat or a plurality of self-assembly hot water mats are used will be described with reference to FIGS. 3 to 6.

Figure 3:
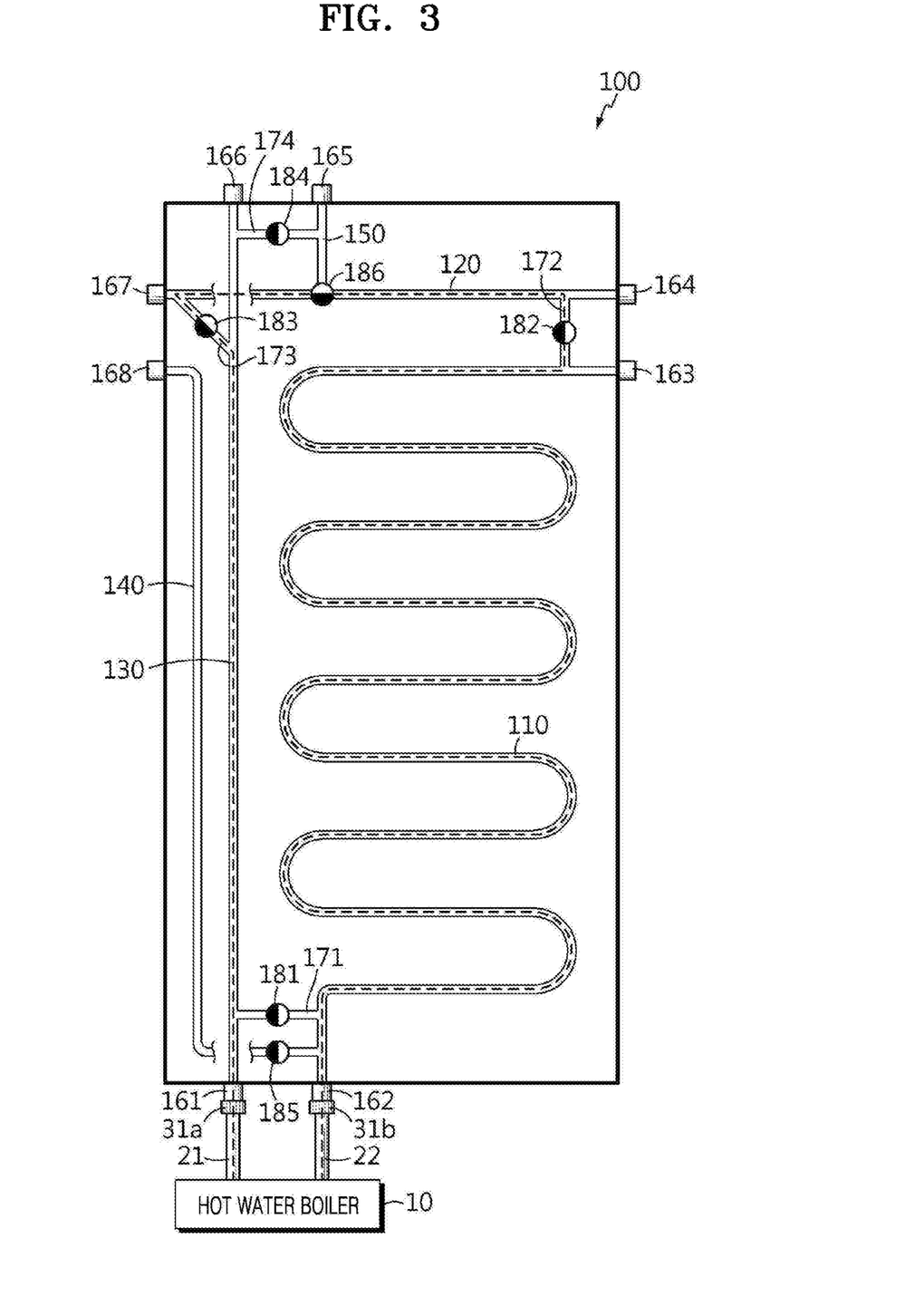
FIG. 3 is a diagram illustrating a hot water flow and a bypass valve state when one self-assembly hot water mat is used, according to an aspect of the present disclosure.

FIG. 3 is a diagram illustrating a hot water flow and a bypass valve state when one self-assembly hot water mat is used, according to an aspect of the present disclosure.

Referring to FIG. 3, the second check valve 162 and a hot water inflow hose 22 of a hot water boiler 10 may be connected to each other through the second extension connector 31b, and the first check valve 161 and a hot water outflow hose 21 may be connected to each other through the first extension connector 31a.

Accordingly, the hot water heated in the hot water boiler 10 may flow into the self-assembly hot water mat 100 through the second check valve 162, circulate through the inside thereof, flow out through the first check valve 161, return to the hot water boiler 10, and then be heated again.

In FIG. 3, only the first check valve 161 and the second check valve 162 formed at the lower side (i.e., the first side) may be opened by being coupled to the extension connectors 31a and 31b, and the other check valves 163 to 168 may maintain the closed state by not being coupled to the extension connectors 31a and 31b. Accordingly, in the self-assembly hot water mat 100 according to FIG. 3, the hot water may flow in/out through only the first side.

Also, among the bypass valves of the self-assembly hot water mat 100 according to FIG. 3, only the second bypass valve 182 and the third bypass valve 183 may be opened, and the other bypass valves 181, 184, 185, and 186 may maintain the closed state. According to the open/close sates of the bypass valves, the hot water supplied from the hot water boiler 10 may circulate through the second check valve 162, the main pipe 110, the second connection pipe 172, the first bypass pipe 120, the third connection pipe 173, and the second bypass pipe 130 and then flow out through the first check valve 161. That is, when only one self-assembly hot water mat 100 is used, only two bypass valves 182 and 183 may be opened to control the circulation of the hot water flow.

Figure 4:
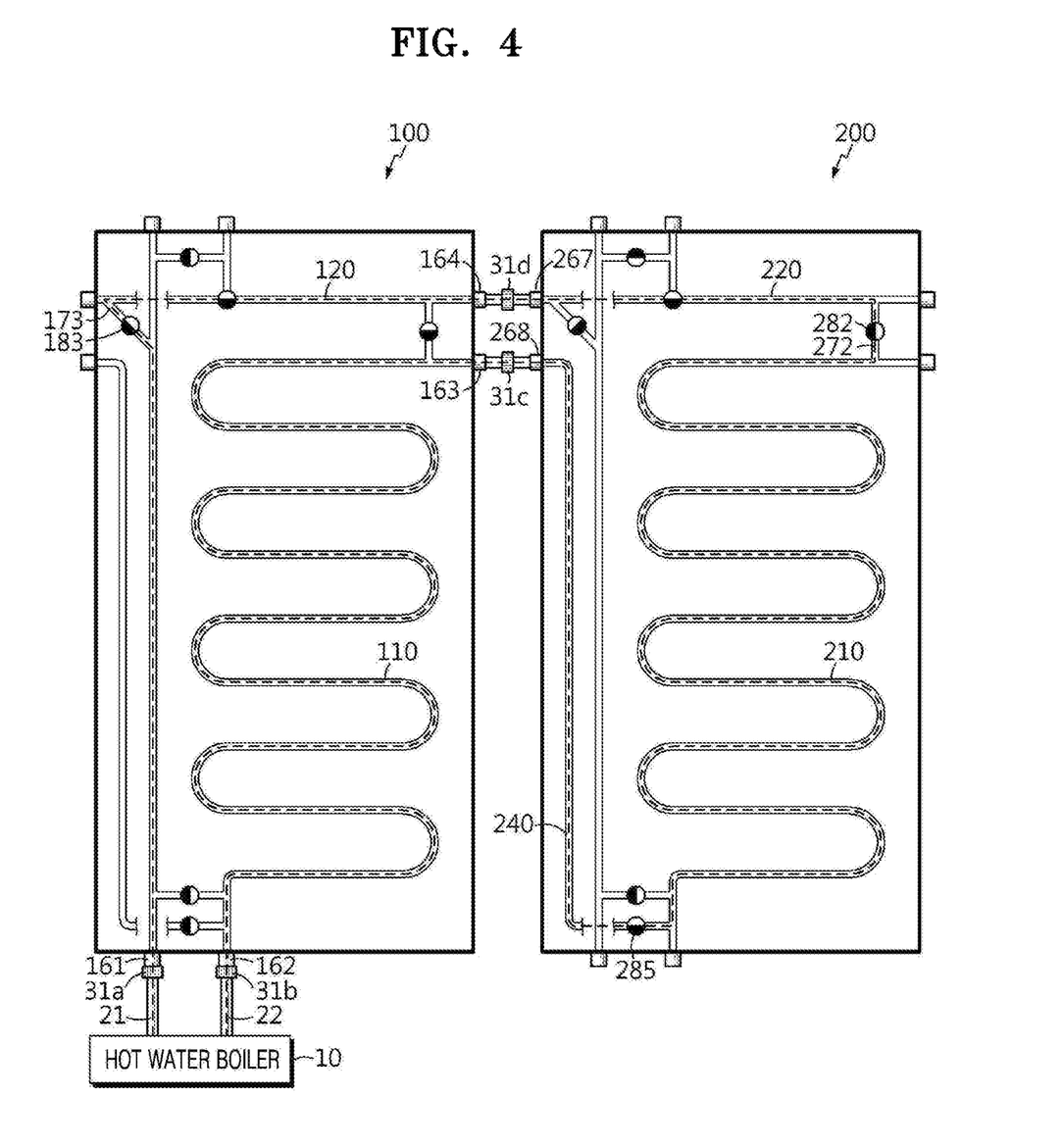
FIG. 4 is a diagram illustrating a hot water flow and a valve open/close state when two self-assembly hot water mats are connected, according to an aspect of the present disclosure.

FIG. 4 is a diagram illustrating a hot water flow and a valve open/close state when two self-assembly hot water mats are connected, according to an aspect of the present disclosure.

Referring to FIG. 4, two self-assembly hot water mats 100 may be connected to each other through a third extension connector 31c and a fourth extension connector 31d. Particularly, the third check valve 163 formed at the right side (i.e., the second side) of the first self-assembly hot water mat 100 may be coupled to the third extension connector 31c and the eighth check valve 268 formed at the left side (i.e., the fourth side) of the second self-assembly hot water mat 200 may also be coupled to the third extension connector 31c to form a hot water passage between the main pipe 110 of the first self-assembly hot water mat 100 and third bypass pipes 240 of the second self-assembly hot water mat 200. Also, the fourth check valve 164 formed at the right side (i.e., the second side) of the first self-assembly hot water mat 100 may be coupled to the fourth extension connector 31d and a seventh check valve 267 formed at the left side (i.e., the fourth side) of the second self-assembly hot water mat 200 may also be coupled to the fourth extension connector 31d to form an extended hot water passage between the first bypass pipe 120 of the first self-assembly hot water mat 100 and first bypass pipes 220 of the second self-assembly hot water mat 200.

According to the coupling state of FIG. 4, the right side of the first self-assembly hot water mat 100 and the left side of the second self-assembly hot water mat 200 may be pipe-coupled to each other to circulate the hot water through the two self-assembly hot water mats 100 and 200.

Also, among the bypass valves of the first self-assembly hot water mat 100 according to FIG. 4, only the third bypass valve 183 may be opened; and among the bypass valves of the second self-assembly hot water mat 200, the second bypass valve 282 and the fifth bypass valve 285 may be opened and the other bypass valves thereof may maintain the closed state. According to the open/close states of the bypass valves, the hot water supplied from the hot water boiler 10 may circulate through the second check valve 162 of the first self-assembly hot water mat 100, the main pipe 110, the third check valve 163, the third extension connector 31c, the eighth check valve 268 of the second self-assembly hot water mat 200, the third bypass pipe 240, the main pipe 210, the second connection pipe 272, the first bypass pipe 220, the seventh check valve 267, the fourth extension connector 31d, the fourth check valve 164 of the first self-assembly hot water mat 100, the first bypass pipe 120, the third connection pipe 173, and the second bypass pipe 130 and then flow out through the first check valve 161. That is, when two self-assembly hot water mats 100 are used, three bypass valves 183, 282, and 285 may be opened to control the circulation of the hot water flow.

Figure 5:
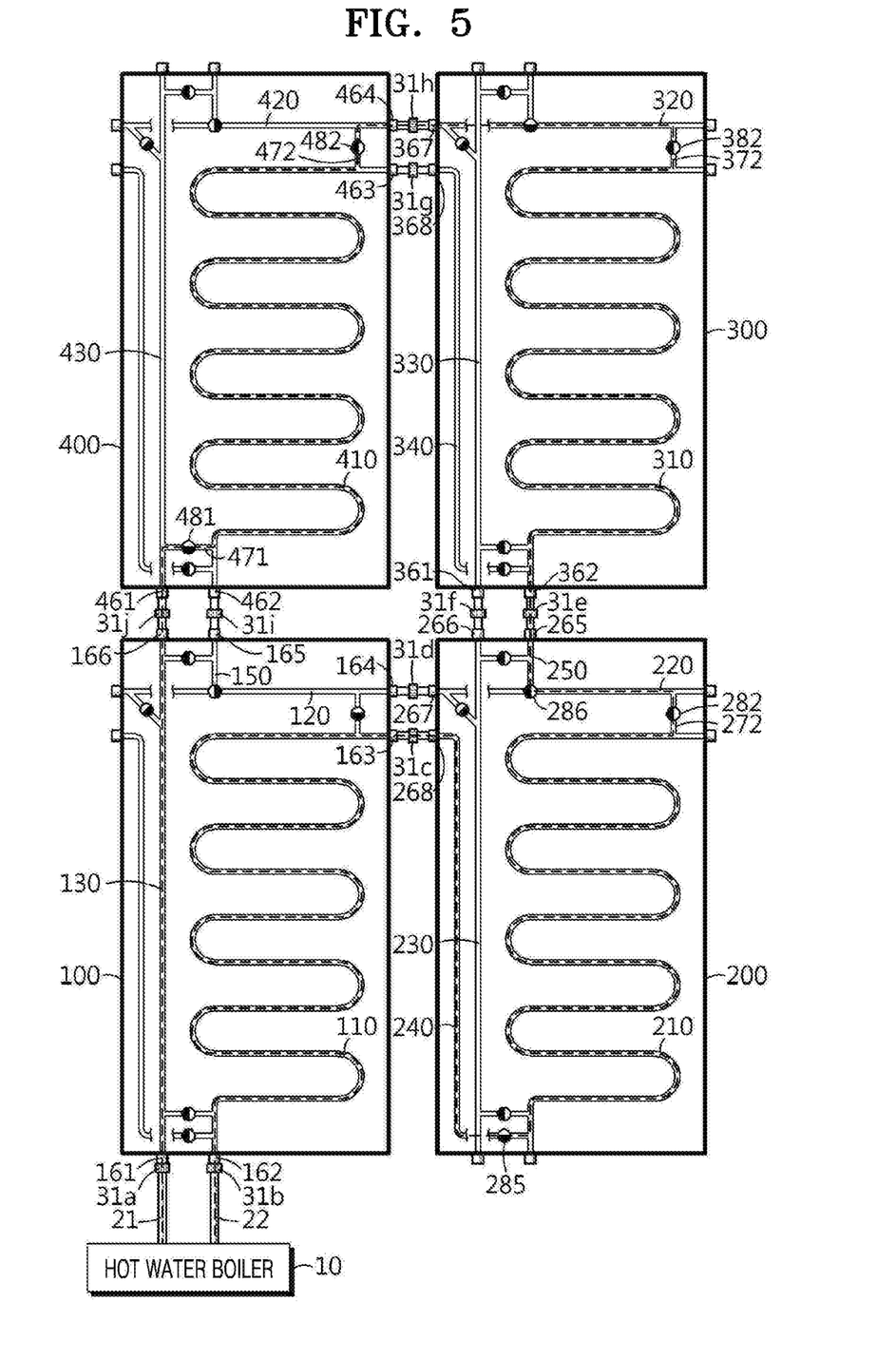
FIG. 5 is a diagram illustrating a hot water flow when four self-assembly hot water mats are connected, according to an aspect of the present disclosure.

FIG. 5 is a diagram illustrating a hot water flow when four self-assembly hot water mats are connected, according to an aspect of the present disclosure.

Referring to FIG. 5, four self-assembly hot water mats 100, 200, 300, and 400 may be connected to each other through eight extension connectors 31c to 31j.

Particularly, the third check valve 163 formed at the right side (i.e., the second side) of the first self-assembly hot water mat 100 may be coupled to the third extension connector 31c and the eighth check valve 268 formed at the left side (i.e., the fourth side) of the second self-assembly hot water mat 200 may also be coupled to the third extension connector 31c to form an extended hot water passage between the main pipe 110 of the first self-assembly hot water mat 100 and the third bypass pipes 240 of the second self-assembly hot water mat 200. Also, the fourth check valve 164 formed at the right side (i.e., the second side) of the first self-assembly hot water mat 100 may be coupled to the fourth extension connector 31d and the seventh check valve 267 formed at the left side (i.e., the fourth side) of the second self-assembly hot water mat 200 may also be coupled to the fourth extension connector 31d to form an extended hot water passage between the first bypass pipe 120 of the first self-assembly hot water mat 100 and the first bypass pipe 220 of the second self-assembly hot water mat 200.

Also, the fifth check valve 265 formed at the upper side (i.e., the third side) of the second self-assembly hot water mat 200 and the second check valve 362 formed at the lower side (i.e., the first side) of the third self-assembly hot water mat 300 may be coupled to the fifth extension connector 31e to connect a hot water passage between the branch pipe 250 of the second self-assembly hot water mat 200 and the main pipe 310 of the third self-assembly hot water mat 300. In addition, the sixth check valve 266 formed at the upper side of the second self-assembly hot water mat 200 and the first check valve 361 formed at the lower side of the third self-assembly hot water mat 300 may be coupled to each other through the sixth extension connector 31f to connect a hot water passage between the second bypass pipe 230 of the second self-assembly hot water mat 200 and the second bypass pipe 330 of the third self-assembly hot water mat 300.

The seventh check valve 367 formed at the left side of the third self-assembly hot water mat 300 and the fourth check valve 464 formed at the right side of the fourth self-assembly hot water mat 400 may be coupled to each other through the eighth extension connector 31h to connect a hot water passage between the first bypass pipe 320 of the third self-assembly hot water mat 300 and the first bypass pipe 420 of the fourth self-assembly hot water mat 400. In addition, the eighth check valve 368 formed at the left side of the third self-assembly hot water mat 300 and the third check valve 463 formed at the right side of the fourth self-assembly hot water mat 400 may be coupled to each other through the seventh extension connector 31g to connect a hot water passage between the third bypass pipe 340 of the third self-assembly hot water mat 300 and the main pipe 410 of the fourth self-assembly hot water mat 400.

The first check valve 461 formed at the lower side of the fourth self-assembly hot water mat 400 and the sixth check valve 166 formed at the upper side of the first self-assembly hot water mat 100 may be coupled to each other through the tenth extension connector 31j to connect a hot water passage between the second bypass pipe 430 of the fourth self-assembly hot water mat 400 and the second bypass pipe 130 of the first self-assembly hot water mat 100. In addition, the second check valve 462 formed at the lower side of the fourth self-assembly hot water mat 400 and the fifth check valve 165 formed at the upper side of the first self-assembly hot water mat 100 may be coupled to each other through the ninth extension connector 31i to connect a hot water passage between the main pipe 410 of the fourth self-assembly hot water mat 400 and the branch pipe 150 of the first self-assembly hot water mat 100.

Also, the open/close states of the bypass valves may be set to circulate the hot water in the coupled state of the self-assembly hot water mat according to FIG. 5. That is, in the assembled state illustrated FIG. 5, all the bypass valves of the first self-assembly hot water mat 100 may be closed, the second bypass valve 282, the fifth bypass valve 285, and the sixth bypass valve 286 among the bypass valves of the second self-assembly hot water mat 200 may be opened, only the second bypass valve 382 among the bypass valves of the third self-assembly hot water mat 300 may be opened, and only the first bypass valve 481 and the second bypass valve 482 among the bypass valves of the fourth self-assembly hot water mat 400 may be opened.

According to the open/close states of the bypass valves, the hot water supplied from the hot water boiler 10 may circulate through the second check valve 162 of the first self-assembly hot water mat 100, the main pipe 110, the third check valve 163, the third extension connector 31c, the eighth check valve 268 of the second self-assembly hot water mat 200, the third bypass pipe 240, the main pipe 210, the second connection pipe 272, the first bypass pipe 220, the branch pipe 250, the fifth check valve 265, the fifth extension connector 31e, the second check valve 362 of the third self-assembly hot water mat 300, the main pipe 310, the second connection pipe 372, the first bypass pipe 320, the seventh check valve 367, the eighth extension connector 31h, the fourth check valve 464 of the fourth self-assembly hot water mat 400, the second connection pipe 472, the main pipe 410, the first connection pipe 471, the first check valve 461, the tenth extension connection 31j, the sixth check valve 166 of the first self-assembly hot water mat 100, and the second bypass pipe 130 and then flow out through the first check valve 161. That is, when four self-assembly hot water mats 100 are used, only six bypass valves 282, 285, 286, 382, 481, and 482 may be opened to control the circulation of the hot water flow through all the main pipes 110, 210, 310, and 410.

Meanwhile, in the mat coupling structure of FIG. 5, the extension connector where the hot water does not circulate may be removed. That is, in the structure in which four self-assembly hot water mats are coupled as illustrated in FIG. 5, the fourth extension connector 31d, the sixth extension connector 31f, the seventh extension connector 31g, and the ninth extension connector 31i may be removed. That is, the four connectors 31d, 31f, 31g, and 31i may be omitted from the necessary components according to the hot water flow.

Figure 6:
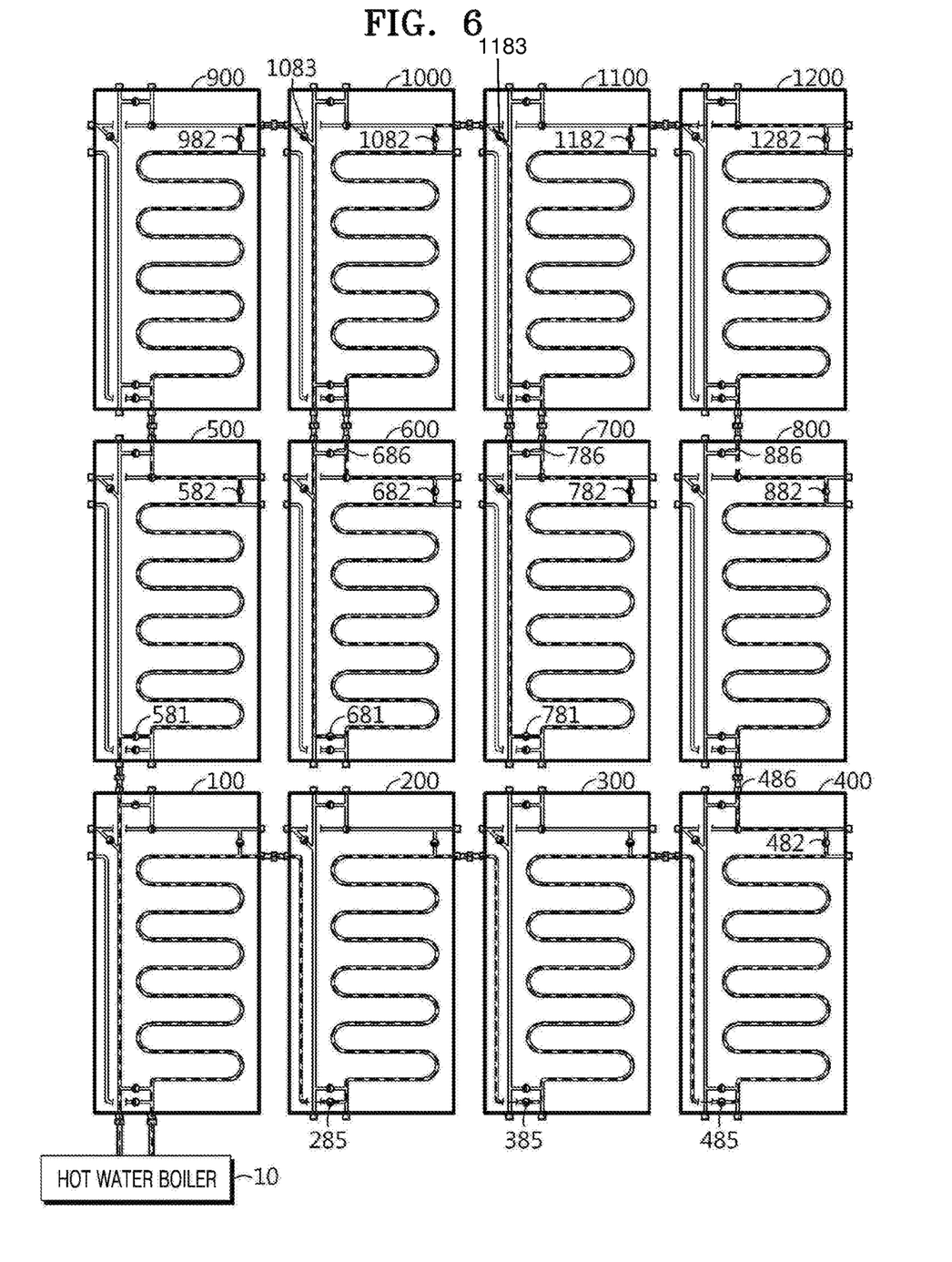
FIG. 6 is a diagram illustrating a hot water flow in a hot water mat assembled in the form of a 4×3 array, according to another aspect of the present disclosure.

FIG. 6 is a diagram illustrating a hot water flow in a hot water mat assembled in the form of a 4×3 array, according to another aspect of the present disclosure.

Referring to FIG. 6, 12 self-assembly hot water mats may be assembled through a plurality of extension connectors. In FIG. 6, it may be seen that the extension connector is not installed at a portion where the hot water does not circulate.

In the assembled state of the self-assembly hot water mats according to FIG. 6, some bypass valves may be selected and opened. That is, in the assembled state illustrated FIG. 6, all the bypass valves of the first self-assembly hot water mat 100 may be closed, only the fifth bypass valve 285 among the bypass valves of the second self-assembly hot water mat 200 may be opened, and only the fifth bypass valve 385 among the bypass valves of the third self-assembly hot water mat 300 may be opened, and the second bypass valve 482, the fifth bypass valve 485, and the sixth bypass valve 486 among the bypass valves of the fourth self-assembly hot water mat 400 may be opened. Also, a first bypass valve 581 and a second bypass valve 582 among the bypass valves of the fifth self-assembly hot water mat 500 may be opened, a first bypass valve 681, a second bypass valve 682, and a sixth bypass valve 686 among the bypass valves of the sixth self-assembly hot water mat 600 may be opened, a first bypass valve 781, a second bypass valve 782, and a sixth bypass valve 786 among the bypass valves of the seventh self-assembly hot water mat 700 may be opened, and a second bypass valve 882 and a sixth bypass valve 886 among the bypass valves of the eighth self-assembly hot water mat 800 may be opened. In addition, only a second bypass valve 982 among the bypass valves of the ninth self-assembly hot water mat 900 may be opened, a second bypass valve 1082 and a third bypass valve 1083 among the bypass valves of the tenth self-assembly hot water mat 1000 may be opened, a second bypass valve 1182 and a third bypass valve 1183 among the bypass valves of the eleventh self-assembly hot water mat 1100 may be opened, and only a second bypass valve 1282 among the bypass valves of the twelfth self-assembly hot water mat 1200 may be opened.

According to the open/close states of the bypass valves, the hot water supplied from the hot water boiler 10 may circulate through the main pipe of the first self-assembly hot water mat 100, the third bypass pipe and the main pipe of the second self-assembly hot water mat 200, the third bypass pipe and the main pipe of the third self-assembly hot water mat 300, the third bypass pipe, the main pipe, and the branch pipe of the fourth self-assembly hot water mat 400, the main pipe, the first bypass pipe, and the branch pipe of the eighth self-assembly hot water mat 800, the main pipe and the first bypass pipe of the twelfth self-assembly hot water mat 1200, the main pipe of the eleventh self-assembly hot water mat 1100, the branch pipe, the first bypass pipe, the main pipe, and the second bypass pipe of the seventh self-assembly hot water mat 700, the second bypass pipe of the eleventh self-assembly hot water mat 1100, the main pipe of the tenth self-assembly hot water mat 1000, the branch pipe, the first bypass pipe, the main pipe, and the second bypass pipe of the sixth self-assembly hot water mat 600, the second bypass pipe of the tenth self-assembly hot water mat 1000, the main pipe of the ninth self-assembly hot water mat 900, the branch pipe, the first bypass pipe, and the main pipe of the fifth self-assembly hot water mat 500, and the second bypass pipe of the first self-assembly hot water mat 100 and then re-collect in the hot water boiler 10.

In addition, various assembly structures may be implemented through the self-assembly hot water mats according to the present disclosure. For example, various mat connection structures such as 6×2, 3×3×3, and 4×4×4 may be implemented according to the user's request.

Meanwhile, when each self-assembly hot water mat is assembled, a certain gap may occur between the hot water mats as illustrated in FIGS. 3 to 6. That is, a gap may occur between the self-assembly hot water mats in the process of connecting the connectors. The gap may be filled with a gap filling medium such as Velcro.

As described above, the self-assembly hot water mats according to the present disclosure may be assembled by the user himself or herself without expert help through the coupling of the check valves and the operation of the bypass valves. Also, the self-assembly hot water mats according to the present disclosure may be coupled to each other in any of four sides, thus facilitating the extension of the Ondol region and minimizing the installation cost incurred in constructing the Ondol.

While the specification includes various features, such features should not be construed as limiting the scope of the present disclosure or the scope of the appended claims. Also, the features described in individual aspects of the present disclosure herein may be combined and implemented in a single embodiment. On the contrary, various features described in a single embodiment may be individually implemented in various embodiments or suitably combined and implemented.

While aspects of the present disclosure have been described above with reference to the accompanying drawings, the present disclosure is not limited by the above aspects and the accompanying drawings since those of ordinary skill in the art will understand that various substitutions, modifications, and changes may be made therein without departing from the spirit and scope of the present disclosure as defined by the following claims.

It should be understood that aspects of the present disclosure described herein should be considered in a descriptive sense only and not for purposes of limitation. Descriptions of features or aspects within each embodiment should typically be considered as available for other similar features or aspects in other embodiments.

While one or more aspects of the present disclosure have been described with reference to the figures, it will be understood by those of ordinary skill in the art that various changes in form and details may be made therein without departing from the spirit and scope of the disclosure as defined by the following claims.

What is claimed is:

1. A self-assembly hot water mat capable of being assembled with other self-assembly hot water mats, having four sides, and including a path for circulating hot water, the self-assembly hot water mat comprising:
    a plurality of hot water passages formed in the self-assembly hot water mat to provide a plurality of hot water flow paths;
    an inlet formed at each of the four sides, through which hot water flows in; and
    an outlet formed at each of the four sides and paired with the inlet, through which hot water flows out,
    wherein a plurality of inlets and a plurality of outlets are connected to the plurality of hot water passages, and hot water flowing in through the inlet at any one of the four sides flows out through the outlet at any one place selected among the four sides via the hot water passage,
    wherein one or more bypass valves are installed at the plurality of hot water passages and are opened/closed to form one or more different hot water flow paths,
    wherein the plurality of hot water passages are hot water flow paths formed in the self-assembly hot water mat,
    wherein the pipes comprise:
        a main pipe extending from the inlet of the first side to the outlet of the second side and forming a largest length among the pipes;
        a first bypass pipe formed to extend from the inlet of the second side to the outlet of the fourth side;
        a second bypass pipe formed to extend from the inlet of the third side to the outlet of the first side;
        a third bypass pine coupled to the main pipe at a point separated from the inlet of the first side at a certain distance and formed to extend from the coupling point to the inlet of the third side;
        a branch pine branched from the first bypass pipe and formed to extend to the outlet of the third side; and
        a plurality of connection pipes connecting the pipes.

2. The self-assembly hot water mat of claim 1, wherein a check valve for opening/closing a flow path is installed at the inlet and the outlet.

3. The self-assembly hot water mat of claim 2, wherein, by the check valve, the flow path is opened when an extension connector is coupled and the flow path is closed when the extension connector is separated.

4. The self-assembly hot water mat of claim 3, wherein one or more of check valves of inlets of the self-assembly hot water mat are coupled through the extension connector to one or more of check valves of outlets of other self-assembly hot water mats to connect a hot water flow path between hot water passages of the self-assembly hot water mats and hot water passages of other self-assembly hot water mats.

5. The self-assembly hot water mat of claim 1, wherein the one or more bypass valves comprises a ball valve, and an operation handle or button is exposed at a top portion of the self-assembly hot water mat.

6. The self-assembly hot water mat of claim 1, wherein the plurality of hot water passages are pipes having a hot water flow path formed therein, and the pipes are buried in the self-assembly hot water mat.

7. The self-assembly hot water mat of claim 1, wherein the plurality of connection pipes comprise:
    a first connection pipe connecting the main pipe to the second bypass pipe;
    a second connection pipe connecting the main pipe to the first bypass pipe;
    a third connection pipe connecting the first bypass pipe to the second bypass pipe; and
    a fourth connection pipe connecting the branch pipe to the second bypass pipe.

8. The self-assembly hot water mat of claim 7, wherein the plurality of bypass valves comprise:
    a first bypass valve installed to control a hot water flow between the main pipe and the second bypass pipe;
    a second bypass valve installed to control a hot water flow between the main pipe and the first bypass pipe;
    a third bypass valve installed to control a hot water flow between the first bypass pipe and the second bypass pipe;
    a fourth bypass valve installed to control a hot water flow between the branch pipe and the second bypass pipe;
    a fifth bypass valve installed to control a hot water flow between the main pipe and the third bypass pipe; and
    a sixth bypass valve installed to control a hot water flow between the branch pipe and the first bypass pipe,
    wherein a circulation path of the hot water is determined according to whether each bypass valve is opened or closed.

* * * * *